United States Patent
Tsukadaira (10) Patent No.: US 12,306,012 B2
(45) Date of Patent: May 20, 2025

(54) MAP UPDATE DEVICE AND MAP UPDATE PROGRAM PRODUCT

(71) Applicant: DENSO CORPORATION, Kariya (JP)

(72) Inventor: Masashi Tsukadaira, Kariya (JP)

(73) Assignee: DENSO CORPORATION, Kariya (JP)

( * ) Notice: Subject to any disclaimer, the term of this patent is extended or adjusted under 35 U.S.C. 154(b) by 164 days.

(21) Appl. No.: 18/147,310

(22) Filed: Dec. 28, 2022

(65) Prior Publication Data

US 2023/0128627 A1 Apr. 27, 2023

Related U.S. Application Data (63) Continuation of application No. PCT/JP2021/022689, filed on Jun. 15, 2021.

(30) Foreign Application Priority Data

Jul. 10, 2020 (JP) .................................. 2020-119191

(51) Int. Cl.
    *G01C 21/00* (2006.01)
(52) U.S. Cl.
    CPC ..... *G01C 21/3859* (2020.08); *G01C 21/3841* (2020.08)
(58) Field of Classification Search
    CPC ..................... G01C 21/3859; G01C 21/3841
    See application file for complete search history.

(56) References Cited

U.S. PATENT DOCUMENTS

| | | | |
|---|---|---|---|
| 2008/0262721 A1 | 10/2008 | Guo et al. | |
| 2011/0276263 A1 | 11/2011 | Shimotani et al. | |
| 2012/0239736 A1 | 9/2012 | Shimotani et al. | |
| 2021/0180959 A1* | 6/2021 | Muto | G08G 1/0112 |
| 2021/0247204 A1 | 8/2021 | Nomura et al. | |
| 2022/0082407 A1* | 3/2022 | Shiota | G01C 21/3848 |

FOREIGN PATENT DOCUMENTS

| | | |
|---|---|---|
| CN | 102341836 A | 2/2012 |
| JP | 2002-318532 A | 10/2002 |
| JP | 2008-051612 A | 3/2008 |
| JP | 2008-267875 A | 11/2008 |
| JP | 2010-210948 A | 9/2010 |
| JP | 2018-510373 A | 4/2018 |
| JP | 2020-038634 A | 3/2020 |
| JP | 2020-091252 A | 6/2020 |
| WO | WO-2016-130719 A2 | 8/2016 |

* cited by examiner

*Primary Examiner* — Andrew J Cromer
(74) *Attorney, Agent, or Firm* — Harness, Dickey & Pierce, P.L.C.

(57) ABSTRACT

A map update device is configured to: generate an integrated map based on a plurality of input maps, each of the plurality of input maps including a probe data element assigned with a reliability; determine a reliability of the generated integrated map; update a reference map by reflecting a difference between the reference map and the integrated map when the determined reliability of the integrated map is equal to or higher than a first predetermined level; store, as one of accumulated data elements, the integrated map when the determined reliability of the integrated map is lower than the first predetermined level and equal to or higher than a second predetermined level, the second predetermined level being set to be lower than the first predetermined level; update the integrated map based on the accumulated data elements; and determine the reliability of the updated integrated map.

12 Claims, 9 Drawing Sheets

MAP UPDATE DEVICE AND MAP UPDATE PROGRAM PRODUCT

CROSS REFERENCE TO RELATED APPLICATIONS

The present application is a continuation application of International Patent Application No. PCT/JP2021/022689 filed on Jun. 15, 2021, which designated the U.S. and claims the benefit of priority from Japanese Patent Application No. 2020-119191 filed on Jul. 10, 2020. The entire disclosures of all of the above applications are incorporated herein by reference.

TECHNICAL FIELD

The present disclosure relates to a map update device and a map update program product.

BACKGROUND

Conventionally, a method of updating a reference map generates an integrated map based on multiple input maps, determines whether there is difference between the generated integrated map and a reference map, and updates the reference map by reflecting the difference in response to determining the existence of difference.

SUMMARY

The present disclosure provides a map update device, which is configured to: generate an integrated map based on a plurality of input maps, each of the plurality of input maps including a probe data element assigned with a reliability; determine a reliability of the generated integrated map; update a reference map by reflecting a difference between the reference map and the integrated map when the determined reliability of the integrated map is equal to or higher than a first predetermined level; store, as one of accumulated data elements, the integrated map when the determined reliability of the integrated map is lower than the first predetermined level and equal to or higher than a second predetermined level, the second predetermined level being set to be lower than the first predetermined level; update the integrated map based on the accumulated data elements; and determine the reliability of the updated integrated map.

BRIEF DESCRIPTION OF DRAWINGS

Objects, features and advantages of the present disclosure will become apparent from the following detailed description made with reference to the accompanying drawings. In the drawings.

DETAILED DESCRIPTION

A known method of updating a reference map is provided. The method generates an integrated map based on multiple input maps, determines whether there is difference between the generated integrated map and a reference map, and updates the reference map by reflecting the difference in response to determining the existence of difference. Specifically, a server generates the integrated map using probe data elements included in the input map, determines whether there is a difference between the generated integrated map and the reference map, and updates the reference map by reflecting the difference on the reference map.

When determining an existence of difference by comparing the integrated map and the reference map, the integrated map is required to have a sufficiently high reliability. However, there are some occasions that the reliability of integrated map is not sufficiently high. Suppose that the difference between the integrated map and reference map is determined using the integrated map, which does not have the sufficiently high reliability, and the reference map is updated by reflecting the determined difference. In this case, the reference map may not be properly updated, and a precision of the reference map may be decreased. For improving the reliability of the reference map, when multiple road data elements exist corresponding to one road, the server may calculate a reliability of each of the multiple road data elements, and select one road data element from the multiple road elements based on the calculated reliability of each of the multiple road data elements.

However, the above-described method may fail to avoid decrease in reliability of the reference map when a reliability of the integrated map is not sufficiently high.

According to an aspect of the present disclosure, a map update device includes an integrated map generating unit, a reliability determining unit, and a difference updating unit. The integrated map generating unit generates an integrated map based on a plurality of input maps. Each of the plurality of input maps includes a probe data element assigned with a reliability. The reliability determining unit determines a reliability of the integrated map generated by the integrated map generating unit. The difference updating unit updates a reference map by reflecting a difference between the reference map and the integrated map when the reliability of the integrated map determined by the reliability determining unit is equal to or higher than a first predetermined level.

In the above configuration, the reliability of the integrated map is determined. When the reliability of the integrated map is determined to be equal to or higher than the first predetermined level, the reference map is updated by reflecting the difference between the reference map and the integrated map with the reliability equal to or higher than the first predetermined level. By setting the reliability of the integrated map being equal to or higher than the first predetermined level as an update condition, the reference map can be properly updated, thereby avoiding decrease in precision of the reference map.

Figure 1:
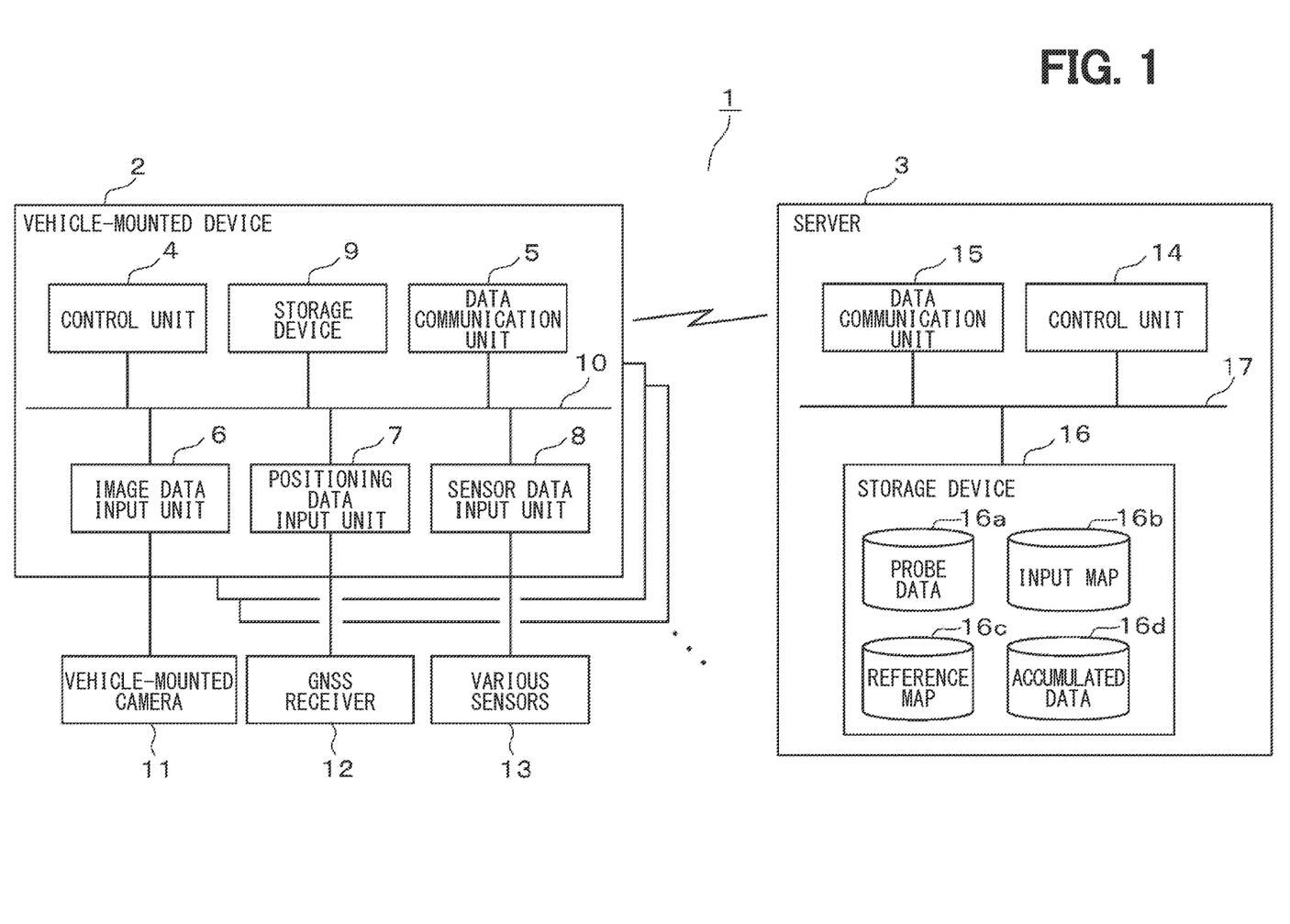
FIG. 1 is a functional block diagram illustrating entire configuration of a map update system in one embodiment.

The following will describe an embodiment of the present disclosure with reference to the accompanying drawings. As shown in FIG. 1, a map update system 1 includes a vehicle-mounted device 2 mounted on a vehicle and a server 3 included in a network. The vehicle-mounted device 2 and the server 3 are configured to perform data communication with one another. Multiple vehicle-mounted devices 2 mounted on respective vehicles communicate with one server 3. The server 3 can perform data communication with multiple vehicle-mounted devices 2. The server 3 corresponds to a map update device.

The vehicle-mounted device 2 includes a control unit 4, a data communication unit 5, an image data input unit 6, a positioning data input unit 7, a sensor data input unit 8, a storage device 9, and an internal bus 10 for performing data communication among these functional blocks. The control unit 4 includes a microcomputer. The microcomputer includes a CPU (Central Processing Unit), a ROM (Read Only Memory), a RAM (Random Access Memory), and I/O (Input/Output). The vehicle-mounted device 2 controls overall operations of the vehicle-mounted device 2 by executing a computer program stored in a non-transitory computer-readable storage medium and performing a process corresponding to the computer program.

The data communication unit 5 controls data communication with the server 3. A vehicle-mounted camera 11, which is provided separately from the vehicle-mounted device 2, captures images of a front area of the vehicle as image data elements, and outputs the image data elements to the vehicle-mounted device 2. When the image data elements are input from the vehicle-mounted camera 11, the image data input unit 6 transmits the image data elements to the control unit 4. A GNSS (Global Navigation Satellite System) receiver 12 is provided separately from the vehicle-mounted device 2. The GNSS receiver 12 receives satellite signals transmitted from a GNSS satellite, measures a position of the vehicle, and outputs positioning data elements to the vehicle-mounted device 2. When receiving the positioning data elements from the GNSS receiver 12, the positioning data input unit 7 transmits the positioning data elements to the control unit 4. Various sensors 13 are provided separately from the vehicle-mounted device 2. The various sensors 13 include, for example, millimeter wave radar and LiDAR (Light Detection and Ranging, Laser Imaging Detection and Ranging), and the like, and output measured sensor data elements to the vehicle-mounted device 2. When the sensor data elements are input from the various sensors 13, the sensor data input unit 8 transmits the sensor data elements to the control unit 4. Partial of entire of the vehicle-mounted camera 11, the GNSS receiver 12, and the various sensors 13 may be integrated with the vehicle-mounted device 2 as one device.

Figure 2:
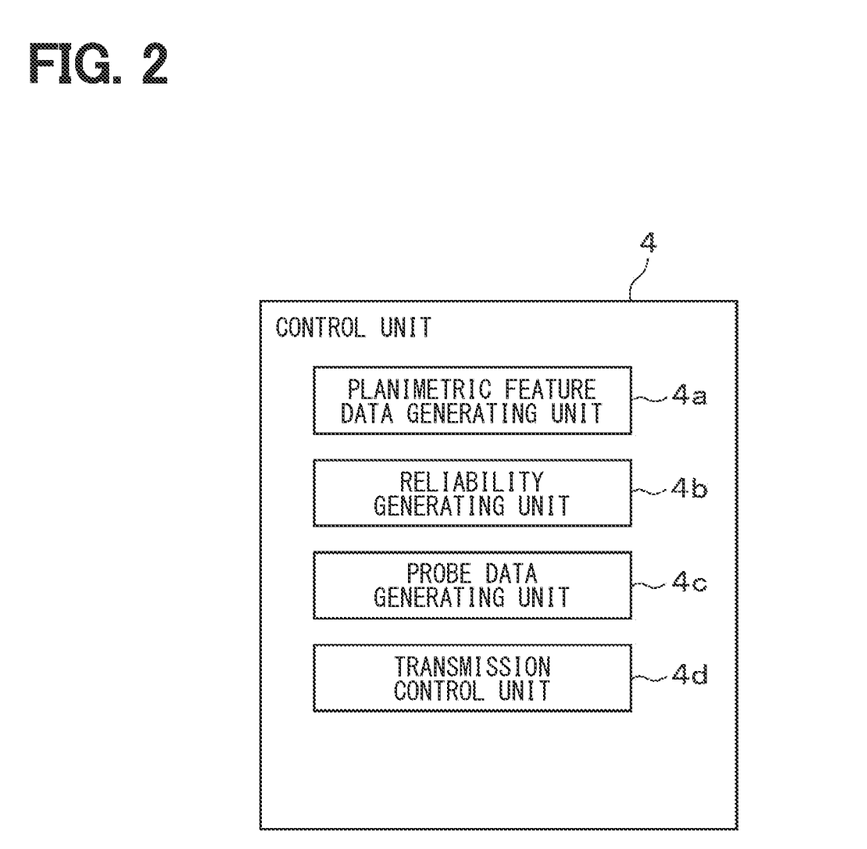
FIG. 2 is a functional block diagram illustrating a control unit of a vehicle-mounted device.

As shown in FIG. 2, the control unit 4 includes a planimetric feature data generating unit 4a, a reliability generating unit 4b, a probe data generating unit 4c, and a transmission control unit 4d. The planimetric feature data generating unit 4a generates, as planimetric feature data element, by correlating planimetric information, such as vehicle position, measurement time of the vehicle position, a landmark, or boundary line position. For example, the landmark may include a sign or a signboard located on a roadside. The planimetric feature data generating unit 4a generates the planimetric feature data element based on the positioning data elements, the image data elements, and the sensor data elements.

When the planimetric feature data generating unit 4a generates the planimetric feature data elements, the reliability generating unit 4b generates a reliability corresponding to the generated planimetric feature data element. Here, the reliability includes, for example, position reliability and recognition reliability. The position reliability is an index indicating whether an absolute position or a relative position is measured stably or not. The position reliability also indicates whether there is sudden position change such as skidding, vibration, or the like. The position reliability also indicates whether there is an obstacle affecting positioning of the vehicle based on the signals received by the GNSS receiver 12. The position reliability is relatively high when there is no sudden position change such as skidding or vibration, or when there is no obstacle affecting positioning operation executed by the GNSS receiver 12. The position reliability is relatively low when there is sudden position change such as skidding or vibration, or when there is an obstacle affecting positioning operation executed by the GNSS receiver 12. The recognition reliability is an index indicating whether the planimetric feature data elements are stably recognized. The recognition reliability indicates light condition around the vehicle, weather, or existence of other vehicles in front of the vehicle. When the light condition around the vehicle is suitable, for example, the weather is good as sunny, or there is no other vehicles in front of the vehicle, the recognition reliability is relatively high. When the light condition around the vehicle is not suitable, the weather is bad as rainy or snowy, or other vehicle exists in front of the vehicle, the recognition reliability is relatively low.

The reliability generating unit 4b may also generate the reliability corresponding to the planimetric feature data elements indicating the following information. The information may include, information generated when recognizing SFM (Structure from Motion), information generated when detecting the planimetric features, information generated when estimating road slope, information generated when estimating visibilities of sensors, or the like.

Information generated during recognition of SFM may include ego-motion estimation accuracy. The information generated when detecting the planimetric feature may include a position of the planimetric feature, a size of the planimetric feature, a type of the planimetric feature, a color of the planimetric feature, number of times of successfully estimating SFM position, a continuous extrapolation frequency, position when SFM position estimation succeeds, number of SFM points, variation degree of SFM points group, attributes of SFM points group, and so on.

The position of the planimetric feature is a position where the planimetric feature is viewed from an ego vehicle. For example, when the planimetric feature is a sign positioned on a road surface, a possibility of erroneous detection is high and the reliability is low. When the planimetric feature is a sign and a size of the planimetric feature, for example, each of four sides of the planimetric features is less than 0.2 meters or an aspect ratio is abnormal, the possibility of erroneous detection is high and the reliability is low. For example, when the planimetric feature is a sign, the type of the planimetric feature identifies which sign it is. When the feature is a boundary line, the type of the planimetric feature identifies which boundary line it is. Based on the identification result, the possibility of erroneous detection is determined. When the planimetric feature is a boundary line, a color of the line is identified. When the line color is identified as a color other than white or yellow, the possibility of erroneous detection is high and the reliability is low. The number of times of successfully estimating the SFM position is the number of times (accumulated value) of successful 3D position estimation using the SFD points. When the number of times of successfully estimating SFM position is extremely small, it is highly likely that the image has no feature points, and the reliability is low.

The continuous extrapolation frequency is the number of times the position cannot be estimated by the SFM and the position is estimated by ego-motion. When the number of position estimation by ego-motion is greater than the number of position estimation by the SFM, it is highly likely that the image has no feature points or a distance accuracy is low, and the reliability is low. The position when the SFM position estimation succeeds is an installation position of the planimetric feature when the SFM position estimation by the SFM succeeds. When the position estimated by SFM is distant from the vehicle, the distance accuracy is low and the reliability is low. Regarding the number of SFM points, the distance accuracy and the reliability increase with an increase of the number of SFM points. The attributes of SFM points includes segmentation information. When a percentage of the SFM points with corresponding segmentation is high, the distance accuracy is high and the reliability is high.

The information generated when estimating the road slope includes a road slope estimation state, a fitting error, or the like. The road slope estimation state indicates whether the road slope can be estimated. When the road slope cannot be estimated, accuracies of both of up and down slope data and the reliability will be low. The fitting error indicates an accuracy of estimated road slope. The fitting error indicates an average of differences between a fitting curve and the SFM points. When the average of differences is large, the estimated road slope accuracy is low and the reliability is low. The information generated when estimating the sensor visibility includes glass cloudiness level, lens coverage level, bad weather level, backlight level, raindrop adhesion level, snowy road surface level, dissert level, wet road surface level, and the like. The information for generating the reliability of each planimetric feature data element may be other information different from the above-described information.

When the planimetric feature data element is generated by the planimetric feature data generating unit 4a and the corresponding reliability is generated by the reliability generating unit 4b, the probe data generating unit 4c generates probe data element by correlating the generated planimetric feature data element with the corresponding reliability. The probe data generating unit 4c stores the generated probe data element in the storage device 9. The probe data element includes the planimetric feature data element and the corresponding reliability. In addition to the feature data element and the reliability, the probe data element may also include various information, such as a road shape, a road feature, a road width, a positional relationship, or the like.

The transmission control unit 4d reads the probe data elements in units of segment from the storage device 9, and transmits the readout probe data elements from the data communication unit 5 to the server 3 at every time when a predetermined time elapsed or when a travel distance of the vehicle reaches a predetermined value. The segment is a unit for managing the map, and roads and areas on the map are divided in a predetermined size as one segment. The transmission control unit 4d may also reads the probe data elements in units of other parameter instead of in units of segment. Then, the transmission control unit 4d transmits the read probe data elements from the data communication unit 5 to the server 3. For example, instead of in units of segment, the transmission control unit 4d may read the probe data elements in units of area specified by the server 3, or in units of data capacity, or in units of data accumulation period. In this embodiment, the control unit 4 generates the feature data element, generates the corresponding reliability, generates the probe data element, and control the data communication. Alternatively, some of the functions of the control unit 4 may be performed by another vehicle-mounted device. For example, a vehicle-mounted device, which performs recognition process of the images captured by the vehicle-mounted camera, may perform generation of the feature data element and generation of the reliability in parallel with the recognition processing.

The server 3 includes a control unit 14, a data communication unit 15, a storage device 16, and an internal bus for data communication among the components of the server 3. The control unit 14 includes a microcomputer. The microcomputer includes a CPU, a ROM, a RAM, and an I/O. The microcomputer, by executing a computer program stored in a non-transitory computer readable storage medium, performs a process corresponding to the computer program, and controls overall operation of the server 3. The computer program executed by the microcomputer includes a map update program.

The data communication unit 15 controls data communication with the vehicle-mounted device 2. The storage device 16 includes a probe data storage unit 16a storing the probe data elements, an input map storage unit 16b storing the input map, a reference map storage unit 16c storing the reference map, and an accumulated data storage unit 16d storing accumulated data elements. The input map is generated by an input map generating unit 18, which will be described below, based on the probe data elements. The reference map is, for example, a map generated by measuring a site by a map supplier, or a map which is not yet updated by the latest probe data elements. For example, when the non-updated site data does not indicate opening of new roads or the like, the input map generated from the probe data elements includes landmarks and boundary lines, and the reference map corresponding to the site does not include the landmarks and boundary lines.

Figure 3:
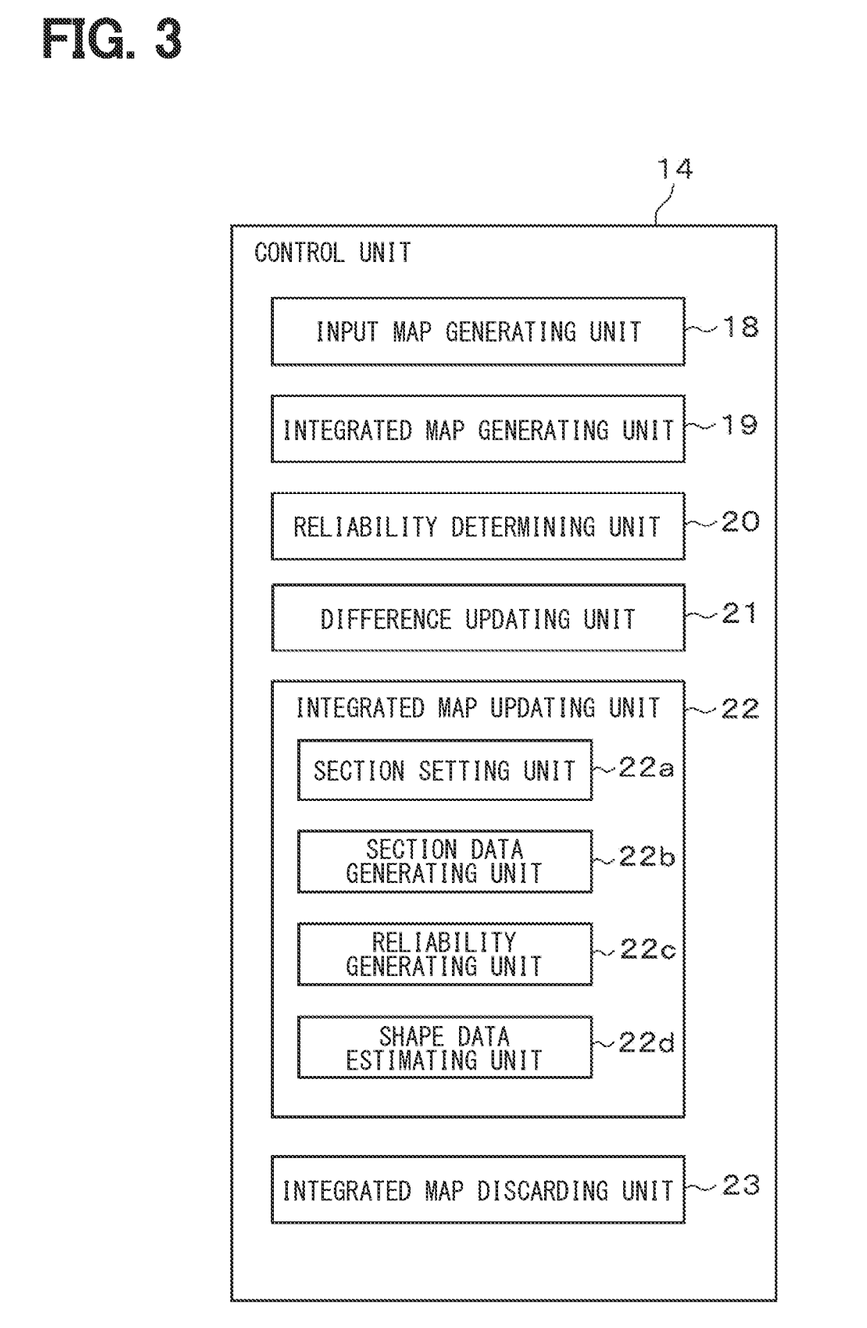
FIG. 3 is a functional block diagram illustrating a control unit of a server.

As shown in FIG. 3, the control unit 14 includes, as functional blocks, an input map generating unit 18, an integrated map generating unit 19, a reliability determining unit 20, a difference updating unit 21, an integrated map updating unit 22, and an integrated map discarding unit 23. These functional blocks correspond to process of the map update program executed by the microcomputer.

When the probe data elements transmitted from the vehicle-mounted device 2 are received by the data communication unit 15, the input map generating unit 18 stores the received probe data elements in the probe data storage unit 16a. Since multiple vehicle-mounted devices 2 communicate with one server 3, the input map generating unit 18 stores, in the probe data storage unit 16a, multiple probe data elements transmitted from multiple vehicle-mounted devices 2. The input map generating unit 18 reads out the probe data elements from the probe data storage unit 16a, and generates the input map based on the readout probe data elements.

When the probe data elements are transmitted from the vehicle-mounted device 2 in units of segment and stored in the probe data storage unit 16a in units of segment the input map generating unit 18 reads out the multiple probe data elements stored in the probe data storage unit 16a in units of segment, and generates the input map based on the readout probe data elements. When the probe data elements are transmitted from the vehicle-mounted device 2 in units of other parameter than segment and stored in the probe data storage unit 16a in units of other parameter than segment, the input map generating unit 18 reads out the probe data elements corresponding to a target segment to be generated from multiple probe data elements stored in the probe data storage unit 16a, and generates the input map based on the readout probe data elements.

The input map generating unit 18 may use the probe data elements transmitted from different vehicle-mounted devices 2, or may use the probe data elements transmitted from the same vehicle-mounted device 2 at different time points. The input map generating unit 18 may consider a situation that multiple input maps may include a common planimetric feature data element with little likelihood. Thus, when the probe data elements are received in units of segment, the segment that has greater number of probe data elements may be selected. For example, the input map generating unit 18 may compare the number of the probe data elements included in each segment with a predetermined quantity. When the number of the probe data elements included in one segment is equal to or greater than the predetermined quantity, the probe data elements included in this segment is selected. The number of the probe data elements included in one segment is less than the predetermined quantity, the probe data elements included in this segment is not selected. As another example, the input map generating unit 18 may determine a detection accuracy of each probe data element. In one segment, when the number of probe data elements, each of which having the detection accuracy equal to or higher than a predetermined level, is equal to or greater than a predetermined quantity, the probe data elements included in this segment is selected. In one segment, when the number of probe data elements, each of which having the detection accuracy equal to or higher than a predetermined level, is less than the predetermined quantity, the probe data elements included in this segment is not selected. The input map generating unit 18 may determine the detection accuracy of the probe data element using the reliability included in each probe data element described above.

The above-described predetermined quantity and the predetermined level may be set as fixed values. Alternatively, the predetermined quantity and the predetermined level may be set as variable values determined based on, for example, traveling position of the vehicle, traveling environment and so on. When the vehicle is traveling in an area with less number of probe data elements and the predetermined quantity is set to a large value, the number of segments acquired as the acquisition target may be excessively small. Thus, in this case, the predetermined quantity may be set to a small value. On the contrary, when the vehicle is traveling in an area with large number of probe data elements and the predetermined quantity is set to a small value, the number of segments acquired as the acquisition target may be excessively large. Thus, in this case, the predetermined quantity may be set to a large value. The same applies to the predetermined level. When the detected environment is bad, for example, affected by weather condition and the predetermined level is set to a high level, the number of segments acquired as the acquisition target may be excessively small. Thus, in this case, the predetermined level may be set to a low level. When the detected environment is relatively good and the predetermined level is set to a low level, the number of segments acquired as the acquisition target may be excessively large. Thus, in this case, the predetermined level may be set to a high level.

The integrated map generating unit 19 generates the integrated map based on the input map generated by the input map generating unit 18. The integrated map generating unit 19 generates the integrated map based on multiple input maps, each of which includes probe data elements with respective reliabilities. The reliability assigned to each probe data element is numericalized as a numeric value, and is associate with the integrated map. The integrated map generating unit 19 calculates the reliability of the generated integrated map as a relatively high value when the reliability of each of the probe data elements included in the input map for generating the integrated map is high. On the other hand, the integrated map generating unit 19 calculates the reliability of the generated integrated map as a relatively low value when the reliability of each of the probe data elements included in the input map for generating the integrated map is low.

When the integrated map generating unit 19 generates the integrated map, the reliability determining unit 20 determines the reliability of the generated integrated map. When the integrated map updating unit 22 updates the integrated map, which will be described later, the reliability determining unit 20 determines the reliability of the updated integrated map. The reliability determining unit 20 classifies the reliability of the integrated map into three levels, for example, a high level, a middle level, and a low level. For classification, a first predetermined level and a second predetermined level set in advance such that the second predetermined level is lower than the first predetermined level. When the reliability of the generated integrated map is equal to or higher than the first predetermined level, the reliability determining unit 20 determines that the reliability of integrated map is high level. When the reliability of the generated integrated map is lower than the first predetermined level and equal to or higher than the second predetermined level, the reliability determining unit 20 determines that the reliability of integrated map is middle level. When the reliability of the generated integrated map is lower than the second predetermined level, the reliability determining unit 20 determines that the reliability of integrated map is low level. The present embodiment describes an example in which the reliability of integrated map is classified into three levels. As another example, the reliability of integrated map may also be classified into two levels or four or more levels.

When the reliability determining unit 20 determines that the reliability of integrated map is at high level, the difference updating unit 21 determines whether there is difference between the integrated map, which has high level of reliability, and the reference map. When determining there is difference between the integrated map and the reference map, the difference updating unit 21 updates the reference map by reflecting the difference to the reference map.

When the reliability determining unit 20 determines that the reliability of integrated map is at middle level, the integrated map updating unit 22 updates the integrated map, which has middle level of reliability, based on the accumulated data elements. When the reliability determining unit 20 determines that the reliability of integrated map is low level, the integrated map discarding unit 23 discards the integrated map, which has low level of reliability.

Figure 4:
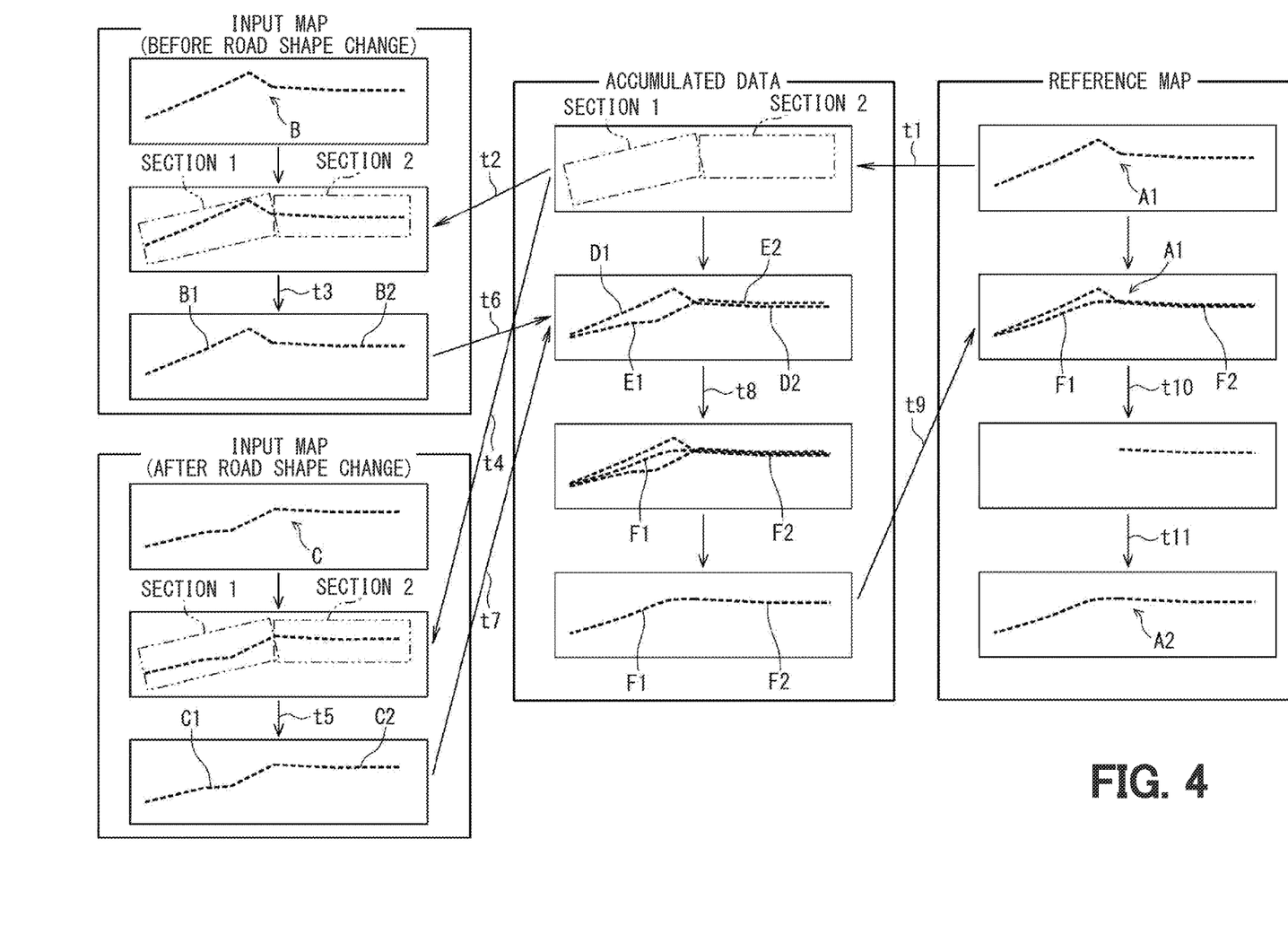
FIG. 4 is a diagram illustrating a procedure of integrated map update process.

The integrated map updating unit 22 updates the integrated map, which has middle level of reliability, based on the accumulated data elements. The integrated map updating unit 22 includes a section setting unit 22a, a section data generating unit 22b, a reliability generating unit 22c, and a shape data estimating unit 22d. The section setting unit 22a sets sections based on the reference map stored in the reference map storage unit 16c. As shown in FIG. 4, when the reference map includes a road shape data element A1 consisting of a probe data group, the section setting unit 22a may divide the road shape data element A1 into a first section and a second section, in units of link (see t1 in FIG. 4). The section setting unit 22a may divide the road shape data element A1 in units of other parameter than the link.

The section data generating unit 22b generates a section data element for each section divided by the section setting unit 22a within the input map stored in the input map storage unit 16b. The section data generating unit 22b generates the section data element for each section within each of the input maps generated by the input map generating unit 18 at different time points. As shown in FIG. 4, suppose that two input maps are generated by the input map generating unit 18 before and after the road shape change. When the input map before road shape change includes a road shape data element B consisting of probe data group, the section data generating unit 22b divides the road shape data element B into a first section 1 and a second section 2, and generates section data element B1 corresponding to the first section 1 and section data element B2 corresponding to the second section 2 (see t2, t3 in FIG. 4). When the input map after road shape change includes a road shape data element C consisting of probe data group, the section data generating unit 22b divides the road shape data element C into a first section 1 and a second section 2, and generates section data element C1 corresponding to the first section 1 and section data element C2 corresponding to the second section 2 (see t4, t5 in FIG. 4). The section data element includes probe data element group.

The section data generating unit 22b generates the section data elements and stores the generated section data elements in the accumulated data storage unit 16d as the accumulated data elements. That is, the accumulated data element includes the probe data element group, similar to the section data element. As shown in FIG. 4, when the section data generating unit 22b generates the section data elements B1, B2 from the road shape data element B, the section data generating unit 22b stores the generated section data elements B1, B2 in the accumulated data storage unit 16d as the accumulated data elements D1, D2 (see t6 in FIG. 4). When the section data generating unit 22b generates the section data elements C1 and C2 from the road shape data element C, the section data generating unit 22b stores the generated section data elements C1 and C2 in the accumulated data storage unit 16d as the accumulated data elements E1, E2 (see t7 in FIG. 4).

The reliability generating unit 22c may generate a reliability for each of the accumulated data elements D1, D2, E1, and E2 based on the probe data element group that consists each accumulated data element. The reliability generating unit 22c may generate the reliability of each the accumulated data element by averaging the reliabilities of corresponding probe data elements included in the corresponding probe data group. When the reliability of each probe data element, which is included in the probe data element group associated with the accumulated data element, is relatively high, the reliability of corresponding accumulated data element is also relatively high. When the reliability of each probe data element, which is included in the probe data element group associated with the accumulated data element, is relatively low, the reliability of corresponding accumulated data element is also relatively low.

When the reliability of each accumulated data element is generated by the reliability generating unit 22c, the shape data estimating unit 22d estimates, for each section, the road shape data element by weighting the reliabilities of multiple accumulated data elements stored in the accumulated data storage unit 16d. For each section, the road shape data element is estimated by weighting the reliability of recent accumulated data element, which is stored recently in the accumulated data storage unit 16d, and the reliability of past accumulated data elements, which is stored in the past in the accumulated data storage unit 16d. As shown in FIG. 4, the accumulated data elements E1, E2 correspond to the recent accumulated data elements, and the accumulated data elements D1, D2 correspond to the past accumulated data elements. The shape data estimating unit 22d estimates, for the first section 1, the road shape data element F1 by weighting the recent accumulated data element E1 and the past accumulated data element D1 according to the reliabilities of respective accumulated data elements E1, D1 (see t8 in FIG. 4). Then, the shape data estimating unit 22d estimates, for the second section 2, the road shape data element F2 by weighting the recent accumulated data element E2 and the past accumulated data element D2 according to the reliabilities of respective accumulated data elements E2, D2 (see t8 in FIG. 4).

Figure 5:
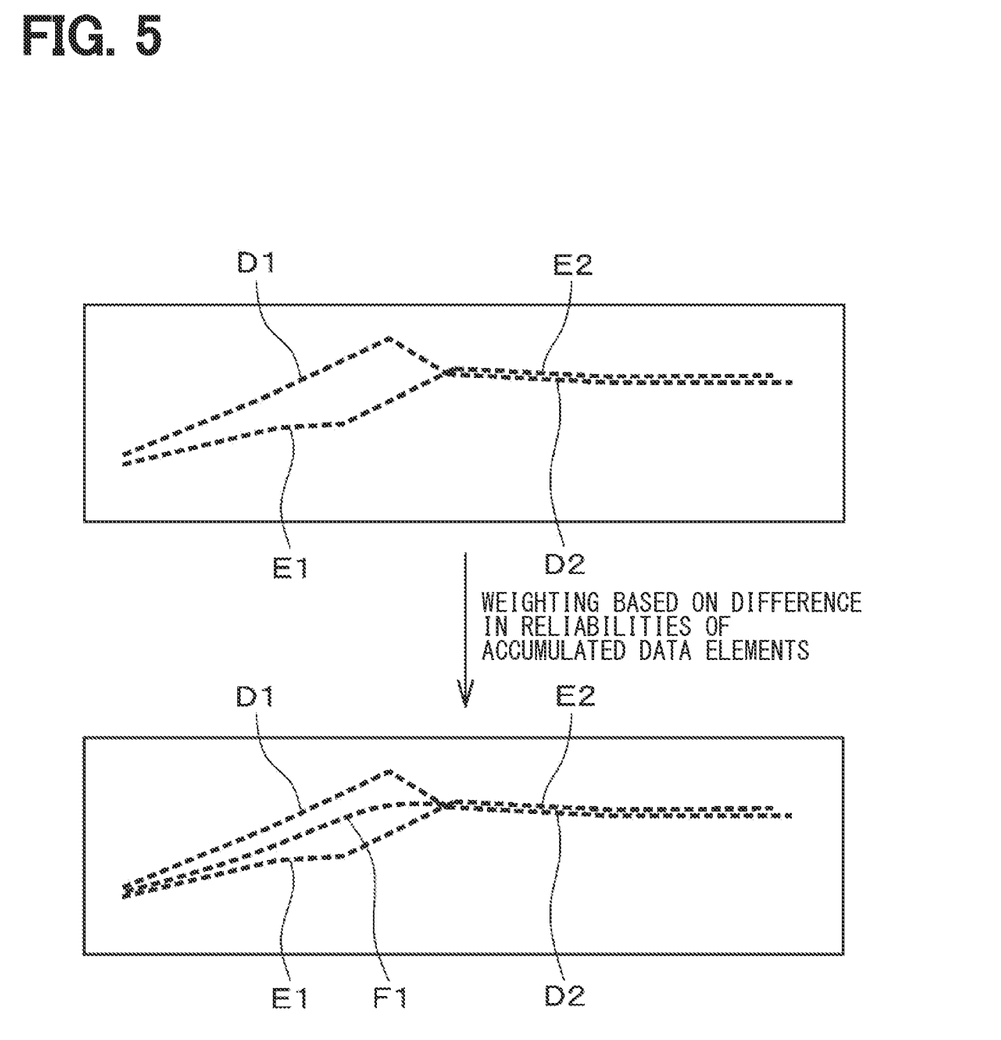
FIG. 5 is a diagram illustrating a procedure of estimating road shape data elements (first example)
Figure 6:
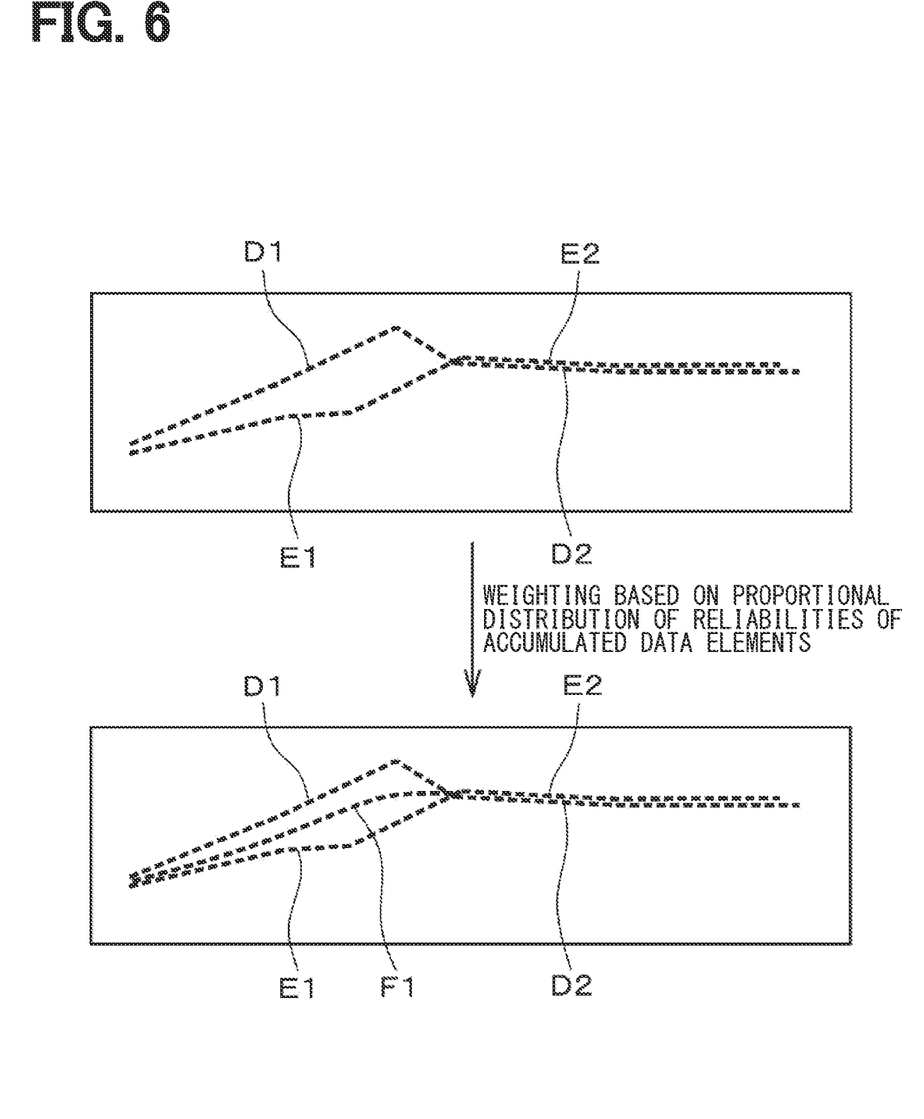
FIG. 6 is a diagram illustrating a procedure of estimating road shape data elements (second example)
Figure 7:
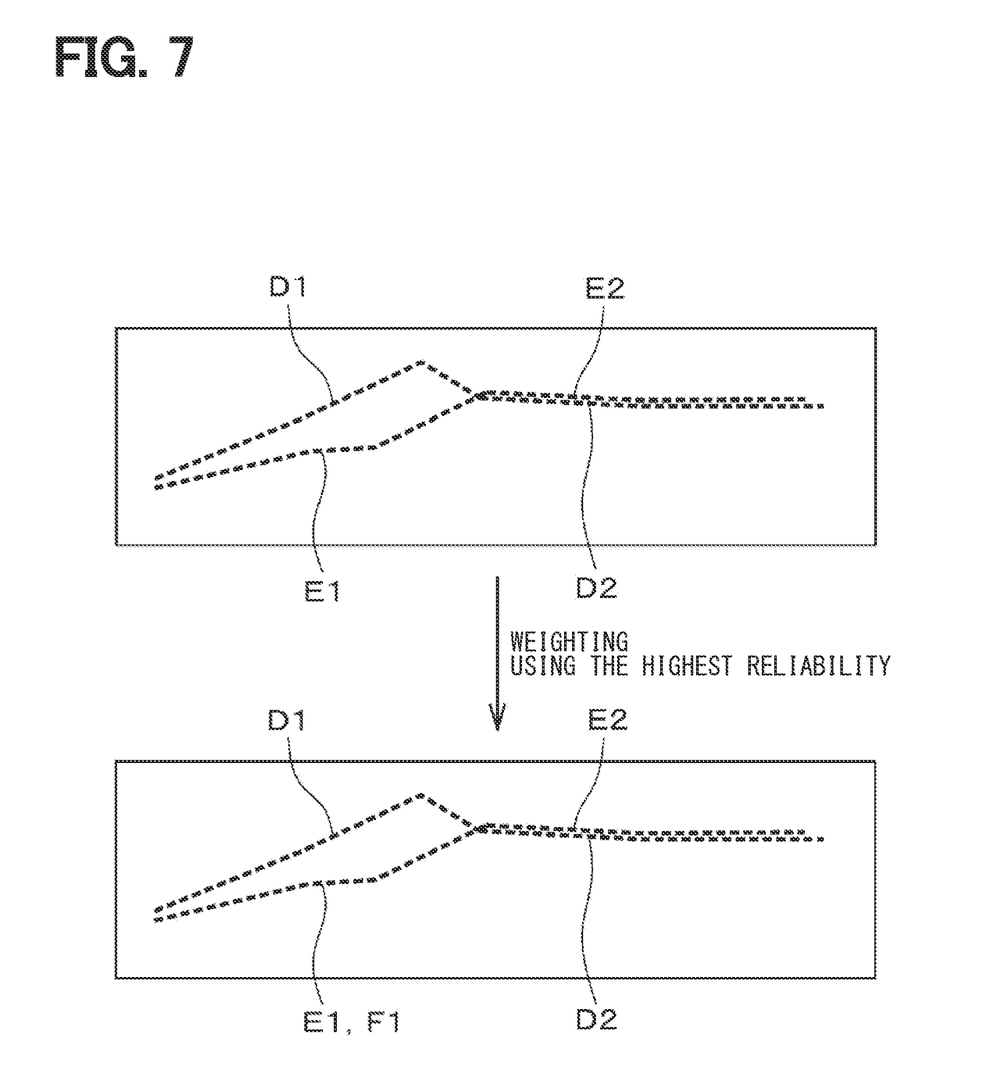
FIG. 7 is a diagram illustrating a procedure of estimating road shape data elements (third example)

The shape data estimating unit 22d may estimate the road shape data element by a first method, in which the accumulated data elements are weighted based on a difference between the reliabilities of two accumulated data elements. The shape data estimating unit 22d may estimate the road shape data element by a second method, in which the accumulated data elements are weighted based on a ratio of the reliability of the first accumulated data element to the reliability of the second accumulated data element. The shape data estimating unit 22d may estimate the road shape data element by a third method, in which the accumulated data elements are weighted with reference to the accumulated data element having the highest reliability. Any one of the first to three methods may be adopted.

As shown in FIG. 5, in the first method, the shape data estimating unit 22d numericalizes a difference between the reliability of the accumulated data element E1 and the reliability of the accumulated data element D1 with in the first section 1. When the numericalized value is lower than a predetermined value, the shape data estimating unit 22d estimates the road shape data element F1 as an intermediate track between a track of the accumulated data element E1 and a track of the accumulated data element D1.

As shown in FIG. 6, in the second method, the shape data estimating unit 22d calculates a proportional distribution of the reliability of the accumulated data element E1, which is indicated by a ratio, and the reliability of the accumulated data element D1, which is indicated by a ratio, with in the first section 1. Then, the shape data estimating unit 22d estimates the road shape data element F1 to have a track, which corresponds to the calculated proportional distribution, between the track of the accumulated data element E1 and the track of the accumulated data element D1. That is, when the reliability of the accumulated data element E1 indicated by ratio is relatively high and the reliability of the accumulated data element D1 indicated by ratio is relatively low, the shape data estimating unit 22d estimates the road shape data element F1 biased to the track of the accumulated data element E1 with higher reliability. When the reliability of the accumulated data element E1 indicated by ratio is relatively low and the reliability of the accumulated data element D1 indicated by ratio is relatively high, the shape data estimating unit 22d estimates the road shape data element F1 biased to the track of the accumulated data element D1 with higher reliability.

As shown in FIG. 7, in the third method, when the reliability of accumulated data element E1 is the highest, that is, higher than the reliability of accumulated data element D1 within the first section 1, the shape data estimating unit 22d estimates the road shape data element F1 same as the track of the accumulated data element E1 with the highest reliability. The shape data estimating unit 22d may adopt any one of the first method, the second method, and the third method to estimate the road shape data element.

When the integrated map is updated by the integrated map updating unit 22 based on the estimated road shape data element, the abovementioned reliability determining unit 20 calculates the reliability of each road shape data element based on the reliability of each accumulated data element used to estimate the road shape data element. Then, the reliability of integrated map is determined. When the reliability of each accumulated data element used for estimating the corresponding road shape data element is relatively high, the reliability determining unit 20 calculates the reliability of corresponding road shape data element to have a relatively high value. When the reliability of each accumulated data element used for estimating the corresponding road shape data element is relatively low, the reliability determining unit 20 calculates the reliability of corresponding road shape data element to have a relatively low value. The reliability determining unit 20 calculates the reliability for each road shape data element, and determines the reliability of the integrated map based on the calculated reliability of each road shape data element. The reliability determining unit 20 classifies the reliability of integrated map into three levels, that is, a high level, a middle level, and a low level. For classifying the reliability, a first predetermined level and a second predetermined level are set such that the second predetermined level is lower than the first predetermined level. When the reliability of the integrated map is equal to or higher than the first predetermined level, the reliability of the integrated map is determined as the high level. When the reliability of the integrated map is lower than the first predetermined level and equal to or higher than the second predetermined level, the reliability of the integrated map is determined as the middle level. When the reliability of the integrated map is lower than the second predetermined level, the reliability of the integrated map is determined as the low level.

When the reliability determining unit 20 determines that the reliability of integrated map is high level, the difference updating unit 21 determines whether there is a difference between the reference map and the integrated map, which has the reliability of high level. When the difference updating unit 21 determines that there is a difference, the difference updating unit 21 updates the reference map by reflecting the determined difference to the reference map. Specifically, as shown in FIG. 4, the difference updating unit 21 compares the road shape data element F1, F2 with the road shape data element A1 in the reference map, and determines whether there is a difference (see t9 in FIG. 4) therebetween. When the difference updating unit 21 determines that there is a difference, the difference updating unit 21 updates the reference map by reflecting the difference in the reference map. As shown in FIG. 4, when the difference updating unit 21 determines that there is a difference in the first section 1 of the reference map, the difference updating unit 21 deletes the road shape data element of the first section 1 in the reference map (see t10 in FIG. 4), adds the estimated road shape data element F1 to replace the deleted road shape data element (see t11 in FIG. 4), and updates the reference map by reflecting the difference as described above. For each of the first section 1 and the second section 2, the difference updating unit 21 updates the road shape data element A1 consisting of the probe data group to the new road shape data element A2.

When the reliability determining unit 20 determines that the reliability of integrated map is middle level, the integrated map updating unit 22 stores the road shape data element as new accumulated data element in the accumulated data storage unit 16*d*. The integrated map updating unit 22 may manage a storage period of each accumulated data element, during which each accumulated data element is stored in the accumulated data storage unit 16*d*. The integrated map updating unit 22 may discard the accumulated data element from the accumulated data storage device 16*d* when the storage period of accumulated data element reaches a predetermined period. When some of the accumulated data elements stored in the accumulated data storage unit 16*d* are similar to one another, the integrated map updating unit 22 may compress the similar accumulated data elements stored in the accumulated data storage unit 16*d*. The integrated map updating unit 22 may discard the road shape data element, the reliability of which is determined as low level.

Figure 8:
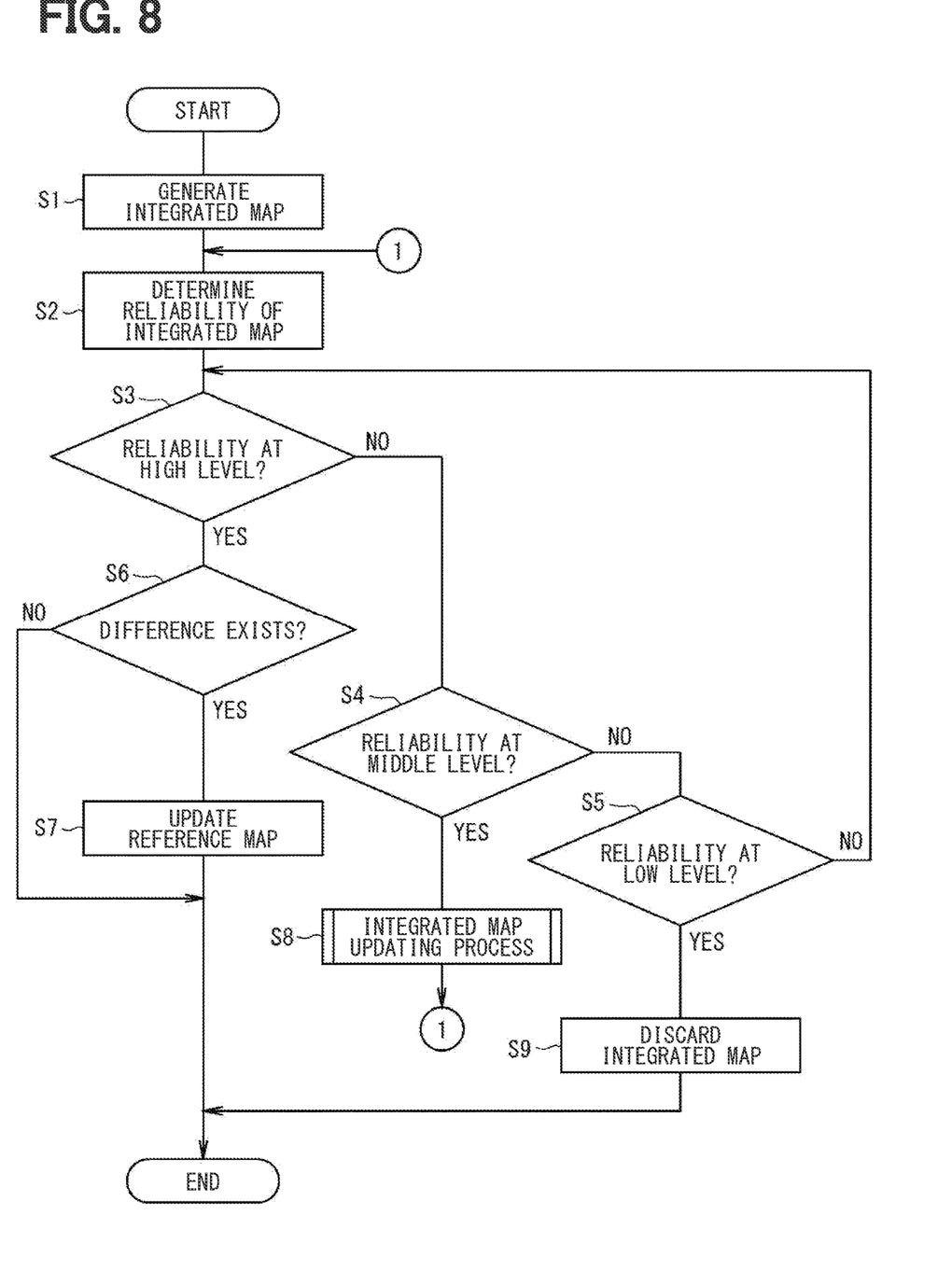
FIG. 8 is a flowchart (part 1)
Figure 9:
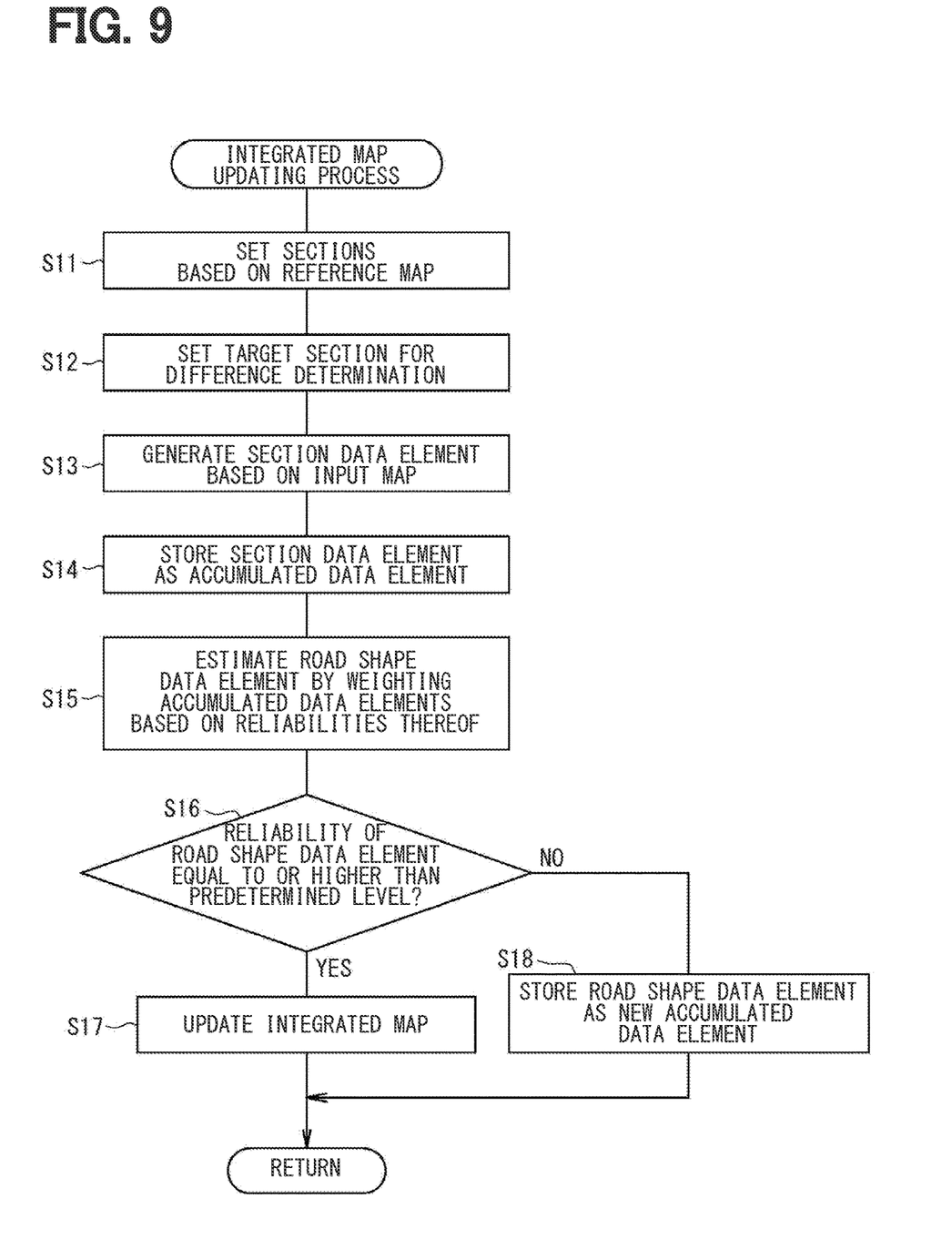
FIG. 9 is a flowchart (part 2).

The following will describe an operation of the above configuration with reference to FIG. 8 and FIG. 9.

In the server 3, the control unit 14 starts the map updating process and generates the integrated map based on multiple input maps (S1, corresponding to generating integrated map). The control unit 14 determines the reliability of generated integrated map (S2, corresponding to determining reliability of integrated map). When the control unit 14 determines that the reliability of generated integrated map is at high level (S3: YES), the control unit 14 further determines whether a difference exists between the integrated map, which has the reliability of high level, and the reference map (S6). When the control unit 14 determines that a difference exists (S6: YES), the control unit 14 updates the reference map by reflecting the difference in the reference map (S7, corresponding to updating difference), and ends the map updating process.

When the reliability of generated integrated map is determined at middle level (S4: YES), the control unit 14 performs an integrated map updating process (S8). When starting the integrated map updating process, the control unit 14 sets sections based on the reference map stored in the reference map storage unit 16*c* (S11). After setting the sections, the control unit 14 sets one of the sections as a target section for difference determination (S12), and generates section data element for each section within the input map including the probe data elements (S13). After generating the section data element, the control unit 14 stores the generated section data element as the accumulated data element in the accumulated data storage unit 16*d* (S14).

The control unit 14 estimates the road shape data element by weighting the reliability of each accumulated data element stored in the accumulated data storage unit 16*d* (S15), and determines whether the reliability of estimated road shape data element is equal to or higher than a predetermined level (S16). When the reliability of estimated road shape data element is equal to or higher than the predetermined level (S16: YES), the control unit 14 updates the integrated map based on the road shape data element with reliability determined as equal to or higher than the predetermined level (S17). Then, the control unit 14 terminates the integrated map updating process, and returns to the map updating process.

When the reliability of estimated road shape data element is determined as lower than the predetermined level (S16: NO), the control unit 14 stores the road shape data element with reliability determined as lower than the predetermined level as new accumulated data element in the accumulated data storage unit 16*d* (S18). Then, the control unit 14 terminates the integrated map updating process, and returns to the map updating process.

After returning to the map updating process, the control unit 14 returns to S2 and repeats the following steps. The control unit 14 determine the reliability of updated integrated map in S2. That is, the control unit 14 performs the updating process to the integrated map, which has the reliability of middle level. When the reliability of updated integrated map increases from the middle level to the high level, the control unit 14 determines whether a difference exist between the reference map and the integrated map, which has the reliability increased from the middle level to the high level (S6). When the control unit 14 determines a difference exists therebetween (S6: YES), the control unit 14 updates the reference map (S7) by reflecting the difference in the reference map. When the reliability of updated integrate map does not increase from the middle level to the high level although the update is executed, the control unit 14 repeatedly executes the integrated map updating process to the integrated map, which has the reliability of middle level. When the control unit determines that the reliability of generated integrated map is low level (S5: YES), the control unit 14 discards the generated integrated map (S9).

As the shape data element, an example of estimating the road shape data element represented by a group of coordinates consisting of multiple sets of coordinates is described as above. The above-described configuration and operation may also be applied to a shape data element of planimetric feature represented by a single set of coordinates.

The above-described present embodiment can provide the following effects.

The server 3 generates the integrated map based on multiple input maps each of which includes probe data elements assigned with corresponding reliability, determines the reliability of generated integrated map, determines whether the reliability of integrated map is at high level, determines whether a difference exists between the reference map and the integrated map, which has reliability of high level, and updates the reference map by reflecting the difference in response to existence of difference being determined. By setting the reliability of integrated map at high level as a condition for updating the reference map, it is possible to properly update the reference map and avoid decrease in precision of the reference map.

When the reliability of integrated map is determined as middle level, the server 3 accumulates the integrated map with reliability determined as middle level as the accumulated data element, and updates the integrated map based on the accumulated data elements. Specifically, the server sets the sections based on the reference map, generates the section data element for each section in the input map including the probe data element assigned with the reliability, and stores the generated section data element as the accumulated data element. The road shape data element is estimated by weighting multiple accumulated data elements corresponding to the same section according to the reliability of each accumulated data element. When the reliability of integrated map is determined as the middle level, the server updates the integrated map based on the accumulated data elements, estimates the road shape data element by weighting the reliability of each accumulated data element, and updates the integrated map based on the estimated road data element.

The server 3 determines the reliability of road shape data element. When the reliability of road shape data element is higher than the predetermined level, the integrated map is updated based on the road shape data element. By setting the reliability of integrated map being higher than the predetermined level as a condition for updating the integrated map based on the road shape data element, the reliability of integrated map can be properly increased.

The server 3 stores the road shape data elements with the reliability determined as lower than the predetermined level as new accumulated data elements, such that the road shape data elements with the reliability lower than the predetermined level can be effectively used to estimate the road shape data elements.

The server 3 discards the road shape data element with the reliability determined as lower than the predetermined level. By discarding the road shape data element with the reliability determined as lower than the predetermined level, a storage capacity required for storing the accumulated data elements can be reduced.

The server 3 compresses similar accumulated data elements within the storage device. By compressing the similar accumulated data elements, a storage capacity required for storing the accumulated data elements can be reduced.

The server 3 manages the accumulated data elements during a storage period, and discards the accumulated data elements when the storage period reaches a predetermined period, such that storage room required for storing the accumulated data elements can be reduced and it is possible to avoid the situation of estimating the road shape data elements using past accumulated data elements.

The server 3 estimates the road shape data element by weighting the multiple accumulated data elements according to the reliability of each accumulated data element. Thus, the road shape data element can be estimated using the reliability of each accumulated data element. The server 3 estimates the road shape data element by weighting the multiple accumulated data elements according to a difference in the reliabilities of accumulated data elements. Thus, the road shape data element can be estimated using the difference in the reliabilities of multiple accumulated data elements. The server 3 estimates the road shape data element by weighting the multiple accumulated data elements using the proportional distribution of the reliabilities of the accumulated data elements. Thus, the road shape data element can be estimated using the proportional distribution of the reliabilities of multiple accumulated data elements. The server 3 estimates the road shape data element by weighting multiple accumulated data elements with reference to the accumulated data element having the highest reliability. Thus, the road shape data element can be estimated using the highest reliability of the accumulated data element.

The server 3 estimates the road shape data element by weighting the recent accumulated data element and the past accumulated data element according to the reliabilities of the probe data elements. By using the recent accumulated data element to estimate the road shape data element, the road shape data element can be estimated up to date.

While the present disclosure has been described based on the embodiment, the present disclosure is not limited to the embodiment or structure described herein. The present disclosure includes various modification examples or variations within the scope of equivalents. Additionally, various combinations and configurations, as well as other combinations and configurations including more, less, or only a single element, are within the scope and spirit of the present disclosure.

The control unit, which may also be referred to as a controller, and a method thereof described in the present disclosure in the above embodiments may be implemented by one or more special-purpose computers. Such computers may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits. The computer program may be stored, as an instruction executed by a computer, in a computer-readable non-transitory tangible storage medium. Alternatively, the control unit and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of a processor and a memory programmed to execute one or more functions and a processor configured by one or more hardware logic circuits. The computer program may be stored in a computer readable and non-transitory tangible storage medium as instructions to be executed by a computer.

In the above-described configuration, the server 3 does not select the segment, which includes the probe data elements less than the predetermined quantity. Also, the server 3 does not select the segment, in which the number of probe data elements with reliability equal to or higher than the predetermined level, is less than the predetermined quantity. A condition for transmitting the probe data elements from the vehicle-mounted device 2 to the server 3 may set in a different manner. In the above configuration, the probe data elements are transmitted to the server 3 every time when a predetermined period elapses or every time a predetermined distance is traveled by the vehicle. The condition for transmitting the probe data elements to the server may be set in different manner. For example, a quantity of the probe data elements detected within the segment may be specified, and the probe data elements may be transmitted from the vehicle-mounted device 2 to the server when the quantity of detected probe data elements within the segment is equal to or greater than the predetermined quantity. For example, when the quantity of detected probe data elements is less than the predetermined quantity due to a preceding vehicle traveling in front of own vehicle. When the quantity of the probe data elements corresponding to one segment is less than the predetermined quantity and these probe data elements are transmitted from the vehicle-mounted device to the server 3, the server 3 may discard theses probe data elements without performing any process on the received data. In the case, the probe data elements may not be transmitted to the server. By canceling transmission of the probe data elements, which is considered to be unnecessary for the server 3, from the vehicle-mounted device 2 to the server 3, the data communication load can be reduced.

What is claimed is:

1. A map update device comprising:
    an integrated map generating unit generating an integrated map based on a plurality of input maps, each of the plurality of input maps including a probe data element assigned with a reliability;
    a reliability determining unit determining a reliability of the integrated map generated by the integrated map generating unit;
    a difference updating unit updating a reference map by reflecting a difference between the reference map and the integrated map when the reliability of the integrated map determined by the reliability determining unit is equal to or higher than a first predetermined level; and
    an integrated map updating unit storing, as one of accumulated data elements, the integrated map when the reliability of the integrated map, which is determined by the reliability determining unit, is lower than the first predetermined level and equal to or higher than a second predetermined level, the integrated map updating unit updating the integrated map based on the accumulated data elements, wherein the second predetermined level is set to be lower than the first predetermined level,
    wherein:
       the reliability determining unit determines the reliability of the integrated map updated by the integrated map updating unit;
       the reliability of the integrated map includes a position reliability and a recognition reliability;
       the position reliability is an index indicating whether an absolute position or a relative position is measured stably or not, and the position reliability indicates whether there is a sudden change of the position or an obstacle affecting specifying of the position based on signals received by a global navigation satellite system (GNSS) receiver, the sudden change of the position including skidding or vibration; and
       the recognition reliability is an index indicating whether planimetric feature data elements are stably recognized, the recognition reliability indicating a light condition and a weather condition around a vehicle or existence of other vehicles in front of the vehicle.

2. The map update device according to claim 1, wherein the integrated updating unit includes:
    a section setting unit setting sections based on the reference map;
    a section data generating unit generating a section data element for each of the sections based on each of the plurality of input maps, each of the plurality of input maps including the probe data element assigned with the reliability; and
    a shape data estimating unit estimating a shape data element for each of the sections by weighting the accumulated data elements according to the reliability of each probe data element, the accumulated data elements being stored in an accumulated data storage unit and including section data elements that are generated at different timings for each of the sections.

3. The map update device according to claim 2, wherein, when a reliability of the shape data element is equal to or higher than a predetermined level, the integrated map updating unit updates the integrated map based on the shape data element, and
when the reliability of the shape data element is lower than the predetermined level, the integrated map updating unit stores the shape data element as a new one of the accumulated data elements in the accumulated data storage unit.

4. The map update device according to claim 2, wherein the integrated map updating unit compresses two or more of the accumulated data elements stored in the accumulated data storage unit when the two or more of the accumulated data elements are similar to one another.

5. The map update device according to claim 2, wherein the integrated map updating unit manages a storage period of each of the accumulated data elements stored in the accumulated data storage unit and discards one of the accumulated data elements, which has the storage period equal to or longer than a predetermined period, from the accumulated data storage unit.

6. The map update device according to claim 2, further comprising
a reliability generating unit generating a reliability of each of the accumulated data elements based on the reliability of each of the probe data elements,
wherein the shape data estimating unit estimates the shape data element by weighting the accumulated data elements according to the reliability of each of the accumulated data elements.

7. The map update device according to claim 6, wherein the shape data estimating unit estimates the shape data element by weighting the accumulated data elements based on a difference in respective reliabilities of the accumulated data elements.

8. The map update device according to claim 6, wherein the shape data estimating unit estimates the shape data element by weighting the accumulated data elements based on a proportional distribution of the reliabilities of the accumulated data elements.

9. The map update device according to claim 6, wherein the shape data estimating unit estimates the shape data element by weighting the accumulated data elements with reference to one of the accumulated data elements with a highest reliability.

10. The map update device according to claim 2, wherein the shape data estimating unit estimates the shape data element by weighting a recent accumulated data element, which is one of the accumulated data elements stored recently in the accumulated data storage unit, and a past accumulated data element, which is another one of the accumulated data elements stored in past in the accumulated data storage unit, according to the reliability of each of the probe data elements.

11. A map update program product stored in a computer-readable non-transitory storage medium, the map update program product comprising instructions to be executed by at least one processor of a map update device for map updating, the instructions comprising:
generating an integrated map based on a plurality of input maps, each of the plurality of input maps including a probe data element assigned with a reliability;
determining a reliability of the generated integrated map;
updating a reference map by reflecting a difference between the reference map and the integrated map when the determined reliability of the integrated map is equal to or higher than a first predetermined level;
storing, as one of accumulated data elements, the integrated map when the determined reliability of the integrated map is lower than the first predetermined level and equal to or higher than a second predetermined level, the second predetermined level being set to be lower than the first predetermined level;
updating the integrated map based on the accumulated data elements; and
determining the reliability of the updated integrated map;
wherein:
the reliability of the integrated map includes a position reliability and a recognition reliability;
the position reliability is an index indicating whether an absolute position or a relative position is measured stably or not, and the position reliability indicates whether there is a sudden change of the position or an obstacle affecting specifying of the position based on signals received by a global navigation satellite system (GNSS) receiver, the sudden change of the position including skidding or vibration; and
the recognition reliability is an index indicating whether planimetric feature data elements are stably recognized, the recognition reliability indicating a light condition and a weather condition around a vehicle or existence of other vehicles in front of the vehicle.

12. A map update device comprising:
a computer-readable non-transitory storage medium; and
a microcomputer, by executing a program stored in the computer-readable non-transitory storage, configured to:
generate an integrated map based on a plurality of input maps, each of the plurality of input maps including a probe data element assigned with a reliability;
determine a reliability of the generated integrated map;
update a reference map by reflecting a difference between the reference map and the integrated map when the determined reliability of the integrated map is equal to or higher than a first predetermined level;
store, as one of accumulated data elements, the integrated map when the determined reliability of the integrated map is lower than the first predetermined level and equal to or higher than a second predetermined level, the second predetermined level being set to be lower than the first predetermined level;
update the integrated map based on the accumulated data elements; and
determine the reliability of the updated integrated map;
wherein:
the reliability of the integrated map includes a position reliability and a recognition reliability;
the position reliability is an index indicating whether an absolute position or a relative position is measured stably or not, and the position reliability indicates whether there is a sudden change of the position or an obstacle affecting specifying of the position based on signals received by a global navigation satellite system (GNSS) receiver, the sudden change of the position including skidding or vibration; and
the recognition reliability is an index indicating whether planimetric feature data elements are stably recognized, the recognition reliability indicating a light condition and a weather condition around a vehicle or existence of other vehicles in front of the vehicle.

* * * * *